No. 11,699. Reissued Oct. 25, 1898.
D. H. ALLEN & W. H. GAMBLE.
PRICE INDICATING ATTACHMENT FOR WEIGHING SCALES.
(Application filed Mar. 3, 1898.)
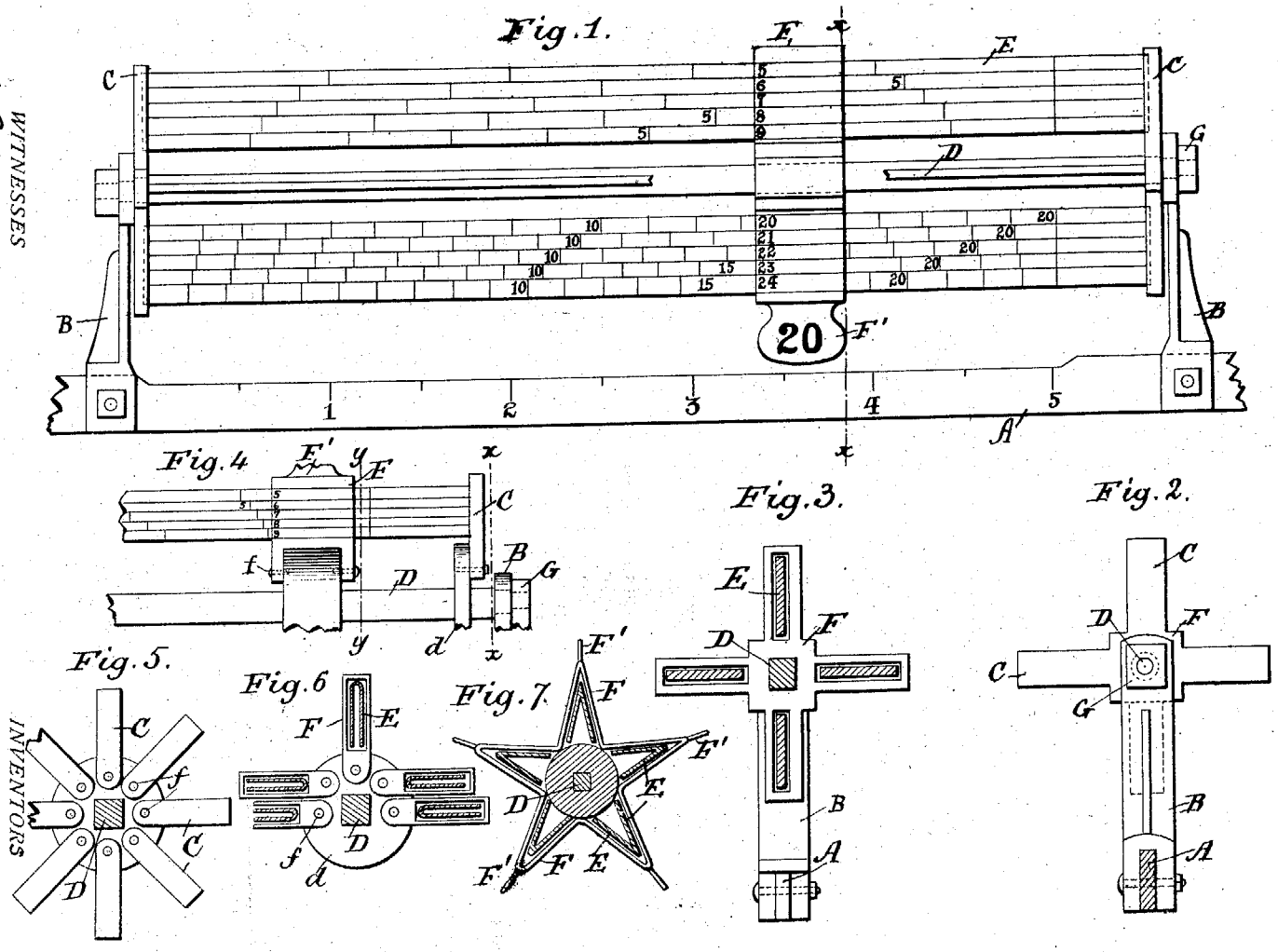
WITNESSES
A. B. Driggs
R. V. Jenni
INVENTORS
William H. Gamble and David H. Allen
BY Frank E. Kochne Attorney

UNITED STATES PATENT OFFICE.

DAVID H. ALLEN AND WILLIAM H. GAMBLE, OF MIAMISBURG, OHIO.

PRICE-INDICATING ATTACHMENT FOR WEIGHING-SCALES.

SPECIFICATION forming part of Reissued Letters Patent No. 11,699, dated October 25, 1898.

Original No. 489,942, dated January 17, 1893. Application for reissue filed March 3, 1898. Serial No. 672,465.

*To all whom it may concern:*

Be it known that we, DAVID H. ALLEN and WILLIAM H. GAMBLE, citizens of the United States, and residents of Miamisburg, county of Montgomery, and State of Ohio, have invented a new and useful Improvement in Price-Indicating Attachments for Weighing-Scales, of which the following is a full, clear, and exact description, reference being had to the accompanying drawings, making a part of this specification.

Our invention relates to an improved price and value indicating attachment for weighing-scales by the use of which the operator may readily determine the value, at any or all of a list of prices, of goods weighed on the scale to which the indicator is attached.

The invention consists of one or more graduated tables or leaves attached, preferably, to an ordinary scale-beam and arranged to swing or revolve around an axis running practically parallel with the scale-beam and of a weighted, sliding, and graduated index or price-list, which extends at right angles to said axis across the face of the tables and is adapted to travel parallel with said axis.

The invention also consists of parts and combinations of the same, specifically hereinafter set forth, and pointed out in the claims.

Referring to the annexed drawings, which form a part of this specification, and in which similar letters indicate corresponding parts in all the views, Figure 1 represents a side elevation of a portion of an ordinary scale-beam with the improvements attached thereto. Fig. 2 is an end view, and Fig. 3 is a cross-sectional view, of the same through the line *x x* of Fig. 1. Fig. 4 is a side elevation of a portion of the improvement. Fig. 5 is a cross-sectional view of the same through the line *x x* of Fig. 4, and Fig. 6 is a cross-sectional view through the line *y y* of Fig. 4. Fig. 7 shows V-shaped tables and indices arranged in star shape.

Referring to the drawings by letter, A represents a portion of an ordinary scale-beam. The standards B, which support the price-indicator, are attached to the beam A in any suitable manner, but preferably with bolts. The shaft D, which is provided with shoulders that press the arms or end pieces C, passes through circular bearings or boxes in the standards B and is provided with threaded ends, on which are adjusted the nuts G. The tables E may be fastened to the arms C in any suitable manner, but preferably are clamped between the arms C by means of the shaft D and the nuts G, the arms C being provided with slots or grooves which engage the ends of the tables E. The tables E are composed, preferably, of strips of sheet metal, each strip stamped on both indicating-faces with suitable figures and division-marks. In the manufacture of this price-indicator, however, it may be desirable for convenience in stamping and in order to make a stronger table to make each of the tables of a strip of sheet metal bent into V or U shape, as shown in Fig. 6. To accomplish this, a flat piece of sheet metal of about twice the width of the intended table will be stamped on one side only in such manner that when the sheet is afterward bent double or into U or V shape it will form a U or V shaped bar having both indicating-faces properly graduated. It will be seen that a plate or table thus formed is lighter and stronger than one made from a solid sheet of metal not so bent.

The arms C may consist of a single piece of metal. In this case the tables or leaves E will be held a fixed distance from each other, and when one table is revolved all the other tables will revolve in unison. The whole might be compared to a paddle or water wheel, the graduated tables corresponding to the blades or paddles of the water-wheel. It will be observed that when the arms C are thus made of one solid piece (where the tables are not V or U shaped and arranged in star shape, as in Fig. 7) more than four tables could not profitably be used, as if more than four were used the angles formed by the indicating-surfaces of the tables would be acute angles and the tables could not be read so well as when only four tables are used, in which case the angles formed by the indicating-faces of the tables are right angles. However, in the course of manufacture it will be necessary to increase the scope of the price-indicator for certain kinds of scales, and to this end it will be desirable to use more than four tables. This can readily be done and in such a way also that the tables may be easily read by making the arms C not of a single piece, but each arm of a separate piece, which will revolve or swing a certain distance independently of the other arms. When the arms C are thus constructed, it will be observed that the tables E will each revolve or swing a certain distance independently of the other tables. Any table selected to be read can then be turned into position suitable for reading, and the other tables, on either side thereof, can be revolved away from said table, so that the operator will have an unobstructed view of the one selected. One manner of attaching the arms C so that they can be swung thus independently is illustrated in Figs. 4 and 5, which are views of a portion of the price-indicator with all the tables removed but one. The arm C is pivoted at *c* to the flange or collar *d*, which is fixed immovably to or forms a part of the shaft D. It can be seen that while the shaft D remains stationary the arm C may be thrown into several different positions, as indicated by dotted lines in Fig. 5.

The sliding weight and index F, on the arms of which is stamped a suitable price-list, is provided with an opening in its body, through which passes the shaft D, on which the index is adapted to slide back and forth. From the body of the index an arm extends across each graduated face of the tables E.

When the tables E are constructed to move in unison, the arms of the index F may form one solid piece with the body of the index; but when the tables are constructed to move independently of each other the indicator F will have to be so constructed that each of its arms will move independently of the other arms and so that each arm will move in unison with the table whose graduated face it crosses. This construction is accomplished when the arms of the index are pivoted to the body of the index, as shown in Fig. 6, the pivot of the index being on a line with the pivot *c* of the arm C.

Each arm of the graduated sliding price-list or index F may be provided with an extension-tablet, as indicated at F′, showing in larger figure the first or lowest price on said list, thereby facilitating ease of finding the price-list desired.

Having thus described our invention, what we claim as new, and desire to secure by Letters Patent, is—

1. A revoluble price and value indicator for weighing-scales, attached to the scale-beam by arms at opposite ends and consisting of a series of tables or leaves which are graduated on both sides and radiate from and revolve around a common axis, said axis extending approximately parallel to the scale-beam, substantially as specified.

2. The combination with a revoluble price and value indicator for weighing-scales, attached to the scale-beam by arms at opposite ends and consisting of a series of tables or leaves which are graduated on both sides and radiate from and revolve around a common axis, said axis extending approximately parallel to the scale-beam, and a weighted sliding and graduated index or price-list which extends at right angles to said axis across each indicating-face of said tables and is adapted to revolve with said tables and to travel back and forth, in a line parallel with said axis, substantially as specified.

In testimony whereof we have hereunto set our hands this 4th day of January, A. D. 1898.

DAVID H. ALLEN.
WILLIAM H. GAMBLE.

Witnesses:
J. C. MYERS,
IRA C. KOEHNE.